United States Patent [19]

Lee et al.

[11] 4,293,352

[45] Oct. 6, 1981

[54] DEGRADABLE BINDER EXPLOSIVES

[75] Inventors: Benjamin Y. S. Lee; Russell Reed, Jr., both of Ridgecrest, Calif.; Roger L. Miller, Brigham City, Utah

[73] Assignee: The United States of America as represented by the Secretary of the Navy, Washington, D.C.

[21] Appl. No.: 69,215

[22] Filed: Aug. 23, 1979

[51] Int. Cl.$^3$ .............................................. C06B 45/10
[52] U.S. Cl. ................................ 149/19.4; 149/19.92; 149/92
[58] Field of Search ....................... 149/19.4, 19.92, 92

[56] References Cited

U.S. PATENT DOCUMENTS

| | | | |
|---|---|---|---|
| 3,132,976 | 5/1964 | Klager | 149/19.4 |
| 3,778,320 | 12/1973 | Yosim et al. | 149/109.6 |
| 3,909,497 | 9/1975 | Gendry et al. | 260/77.5 A |
| 3,968,723 | 7/1976 | Falterman et al. | 86/1 A |
| 4,018,636 | 4/1977 | O'Neill et al. | 149/19.4 |
| 4,098,627 | 7/1978 | Tompa et al. | 149/19.92 |

*Primary Examiner*—Edward A. Miller
*Attorney, Agent, or Firm*—R. S. Sciascia; W. Thom Skeer; Lloyd E. K. Pohl

[57] ABSTRACT

Explosive compositions containing a polyurethane binder which will degrade upon contact with dilute mineral acids or aqueous ammonia.

1 Claim, No Drawings

DEGRADABLE BINDER EXPLOSIVES

BACKGROUND OF THE INVENTION

1. Field of the Invention

This invention relates to explosive compositions which contain binders that can be degraded and removed by means of dilute mineral acids or aqueous ammonia to allow recovery of the explosive filler.

2. Description of the Prior Art

As explosive ordnance ages or becomes obsolete it is necessary to dispose of the explosives in a safe manner. In recent years disposal has become a problem since regulations prevent open burning or dumping in the ocean, methods used in the past. A solution to the problem could be attained by devising processes for the separation and recovery (for reuse) of the explosive filler.

This approach has not been successful in the case of explosives containing polymeric, plastic binders, a large and important class of explosives that are termed plastic bonded explosives (PBX).

These plastic binders are generally insoluble and are exceedingly difficult to degrade chemically so that no practical process has been devised for recovery of the explosive fillers from this class of explosive compositions. Explosives containing binders which can be dissolved or degraded upon command are desirable. It is further desirable that the solvent or degrading agent not affect the explosive filler. This permits the filler to be recovered and reused after a solid explosive grain has been treated to dissolve or degrade the binder.

Pursuant to these ecological considerations, water soluble binders have been developed. However, water soluble binders tend to swell in water and to produce viscous gels, an effect which causes explosive compositions to be difficult to process in degradation operations. Moreover, water soluble binders have other drawbacks in that during processing or storage a plastic bonded explosive is almost certain to come into contact with some moisture. Once even a small amount of moisture is absorbed the degradation process sets in. Thus, explosive compositions which contain water soluble binders tend to have short service lives.

SUMMARY OF THE INVENTION

This invention provides plastic bonded explosives which utilize a degradable binder that overcomes the drawback associated with water soluble binders. The binders utilized in this invention are polyesters prepared from liquid polyethylene glycols and adipic acid. They are cured with a diisocyanate to yield polyurethane polymers which are not soluble in water but which are soluble, because of hydrolysis, in dilute reagents such as dilute sulfuric acid and in aqueous ammonia. Since the hydrolysis yields only small water soluble molecules, polymeric gels are avoided. Thus, explosive compositions according to this invention have long service lives and yet can be treated in a manner whereby the binder is removed on command leaving only non-toxic binder-degradation products along with recoverable and reusable explosive fillers.

STATEMENT OF THE OBJECTS OF THE INVENTION

It is an object of the invention to provide an explosive solid which is not readily degradable under service conditions but is easily degradable when desired simply by contact with dilute mineral acids or water solutions of ammonia.

A further object of the invention is the production of an easily degradable plastic bonded explosive-binder composition which upon treatment with dilute mineral acid or ammonia solutions produces a high yield of reusable explosive that is sufficiently pure for reuse and only non-toxic binder-degradation products.

DESCRIPTION OF THE PREFERRED EMBODIMENT

Those ethylene glycols that have average molecular weights between about 200 and about 700 [$HO(CH_2CH_2O)_nH$ wherein n is an integer such that the average molecular weight is between 200 and 700] are liquids. If such a liquid diol is reacted with a dicarboxylic acid such as adipic acid, a polyester results. The polyester has terminal unreacted OH groups attached to the polymer chain and is hydroxyl terminated.

In the practice of this invention, a hydroxyl terminated polyester of the above type is used to prepare the binder for RDX. The particular polyester used in experiments was one sold by Witco Chemical Corporation under the tradename FORMREZ YA23-4. It had a functionality of 2.33, an average molecular weight of 3,500, a hydroxyl number of 38.5, an acid number of 0.7 and a viscosity at 25° C. of 10,000 cps. However, other polyesters prepared from the reaction of liquid ethylene glycols and adipic acid could be used. From this, it readily follows that the average molecular weight and other chemical characteristics could be varied. The essential characteristics of the polyester are (1) a functionality of greater than 2 and (2) a molecular weight such that the polyester is a liquid when the ingredients are mixed.

The best mode for preparing plastic bonded explosives according to this invention involves mixing in vacuo the aforementioned polyester with lysine diisocyanate methyl ester LDIM curative, triphenylbismuth catalyst and RDX and curing the mixture by heating it at about 60° C. for about 72 hours. (A range of from 55° to 65° C. and from 72 to 96 hours is permissible.)

It is preferable to use about 16.56 weight percent polyester, about 1.44 weight percent curative, about 0.05 weight percent cure catalyst and a balance of the explosive filler.

The best results insofar as being able to recover a large percentage of the RDX upon dissolution of the binder was concerned were obtained when the following formulation was used.

| FORMULATION | |
|---|---|
| Ingredient | Weight Percent |
| Polyester (Witco YA23-4) | 16.56 |
| LDIM | 1.44 |
| Triphenylbismuth (added) | (0.02) |
| *Class 1 RDX | 6.56 |
| *Class 3 RDX | 14.76 |
| *Class 4 RDX | 38.54 |
| *Class 5 RDX | 22.14 |

*See Military Specification Mil-R-398C, Amendment 3, 14 August 1973.

The foregoing formulation is based on a ratio of 1.2 NCO groups to 1 OH group and containing 18 weight % binder. This ratio may be varied from 0.8 to 1.5. As a result, the weight percentages set forth are not absolutely required. A 0.8 ratio would result in a binder containing 17.01 weight % polyester and 0.99 weight percent LDIM. A ratio of 1.5 would result in a binder containing 16.24 weight % polyester and 1.76 weight % LDIM.

A ratio of 82 weight % solids to 18 wt. % binder appears optimum. However, compositions containing up to 85 wt. % solids are possible. Naturally compositions containing less than 82 % solid explosives may be processed easily. The above formulation contained a partical size distribution of RDX having a relatively large average partical diameter in order to enhance the recovery of RDX by decantation followed by filtration.

The LDIM cured polyester binder used in the practice of this invention does not degrade upon contact with water. Therefore, no loss of service life because of such contact results from using this binder. The binder does, on the other hand, degrade upon contact with dilute acids such as dilute $H_2SO_4$ and upon contact with water solutions of ammonia. Therefore, once a solid plastic bonded explosive has been prepared and placed in a warhead or related device, either a dilute acid or a dilute ammonia solution may be used to degrade the binder. The usual practice in demilitarization of obsolete ordnance involves a mechanical removal of the explosive with a screw-like cutter, a procedure which yields irregular particles 1-2 inches across. Treatment of these particles with dilute mineral acids (sulfuric or hydrochloric) or with aqueous ammonia produces, in several hours, a precipitate of RDX and a clear solution of the nontoxic binder degradation products. These products are lysine (an essential amino acid), polyethylene glycol and adipic acid (or its ammonium salt).

A simple filtration removes the insoluble RDX solution. The RDX is recovered nearly quantitatively and is suitable for reuse as an explosive filler.

We claim:
1. An easily degradable explosive composition containing about 82 percent explosive solids and about 18 weight percent of a polyurethane binder made from the reaction of from 16.56 weight percent polyester and from 1.44 weight percent of said curative;
    said binder being prepared by reaction of a hydroxyl terminated polyester having a functionality of 2.33 with a curative comprising Lysine diisocyanate methyl ester; and
    said binder being degradable in aqueous ammonia or dilute acid, yielding reusable explosive solids and non-toxic binder-degradation products, and being not degradable upon contact with water.

* * * * *